United States Patent [19]

Kawate et al.

[11] Patent Number: 5,068,606
[45] Date of Patent: Nov. 26, 1991

[54] TWO WIRE MODULATED OUTPUT CURRENT CIRCUIT FOR USE WITH A MAGNETORESISTIVE BRIDGE SPEED/POSITION SENSOR

[76] Inventors: Keith W. Kawate, 12 Virginia Ave., Attleboro Falls, Mass. 02763; James P. Berthold, 32 State St., B12, Attleboro, Mass. 02703; Robert M. Margolis, 265 Upland Ave., Newton, Mass. 02161

[21] Appl. No.: 409,220

[22] Filed: Sep. 19, 1989

[51] Int. Cl.[5] .......................... G01P 3/488; G01B 7/30; G05F 3/26; H03K 17/90
[52] U.S. Cl. ................................ 324/174; 307/309; 323/315; 324/207.12; 324/207.21; 324/207.25; 324/252
[58] Field of Search ................. 324/173, 174, 207.12, 324/207.2, 207.21, 207.25, 225, 251, 252; 307/116, 120, 309; 323/294, 315, 368; 188/181 R

[56] References Cited

U.S. PATENT DOCUMENTS

| | | | |
|---|---|---|---|
| 3,671,767 | 6/1972 | Davis | 307/309 |
| 4,521,727 | 6/1985 | Atherton et al. | 307/309 X |
| 4,543,527 | 9/1985 | Schuchmann et al. | 324/225 X |
| 4,591,739 | 5/1986 | Nagano | 323/315 X |
| 4,687,994 | 8/1987 | Fulkerson et al. | 307/309 X |
| 4,734,594 | 3/1988 | Nelson | 307/309 |
| 4,760,285 | 7/1988 | Nelson | 324/251 X |
| 4,833,406 | 5/1989 | Foster | 324/225 |

Primary Examiner—Gerard R. Strecker

[57] ABSTRACT

A measuring circuit comprising a transducer, a comparator controlled by the transducer, a bandgap reference circuit with current compensation, a first current mirror, a second current mirror controlled by the comparator and bandgap reference to control the total current. The transducer is a magnetoresistive transducer.

5 Claims, 4 Drawing Sheets

TWO WIRE MODULATED OUTPUT CURRENT CIRCUIT FOR USE WITH A MAGNETORESISTIVE BRIDGE SPEED/POSITION SENSOR

CROSS REFERENCE TO RELATED APPLICATION

This application is related to prior filed application Ser. No. 409,226, filed Sep. 19, 1989, the contents of which is incorporated herein by reference.

BACKGROUND OF THE INVENTION

1. Field of the Invention

This invention relates to a system for sensing the position of a ferromagnetic object, such as, for example, a tooth on a moving gearwheel and a magnetoresistive transducer arrangement for determining such position as well as the use of such sensed information to determine the speed and/or position of the magnetic object.

2. Brief Description of the Prior Art

The position and/or velocity of a ferromagnetic object can be magnetically sensed by measurement of the change in a magnetic field caused by the movement of the ferromagnetic object through the magnetic field. The sensor utilized in such measurement arrangements generally comprises a transducer, a conditioner and packaging.

The use of transducers to measure changes in a magnetic field is well known. Such transducers convert some physical phenomenon into an electrical signal from which the measurement is derived. Typically, such transducers have been variable reluctance sensors wherein the movement of a ferromagnetic object in the vicinity of and through the magnetic field of a coil/permanent magnet thereof causes a voltage to be induced in the coil due to the change of the magnetic flux pattern through the coil.

Magnetoresistive transducers are also known in the art and have also been used in the past in conjunction with other circuitry to indicate position and/or measure velocity of a magnetic object. There are several known materials which display magnetoresistive properties, the most common such material being permalloy, a well known nickel-iron alloy. Typical prior art in this regard is set forth in the patent of Kuijk U.S. Pat. No. 4,052,748 and in an article entitled Magnetic Field Sensors Using the Magnetoresistive Effect by U. Dibbern, *Sensors and Actuators*, 10 (1986) 127-140. Indium antimonide, a semiconductor material, is another of the materials which exhibits magnetoresistive properties, this material being sensitive to magnetic fields through its thickness dimension rather than along the thin plane of the material as in the case of permalloy.

In the formation of magnetoresistive elements from permalloy, the permalloy is normally sputtered as a thin layer or film onto a substrate, for example silicon, the permalloy film residing on the substrate and having a thickness of from about 20 to about 200 nanometers and preferably about 50 nanometers. The permalloy is further processed, either during or after sputtering, to induce a permanent magnetization in the film. The permalloy film is often used in a configuration in which a full or half wheatstone bridge pattern is etched onto the film such that a voltage divider network is created. Resistance changes in the film are thereby converted to a voltage output. Permalloy magnetoresistive transducers respond to changes in the magnetic field vector in the plane of the film and do not respond to magnetic field components normal thereto. This response is represented by a change in the electrical resistance of the permalloy as a function of the magnetic field vector passing therethrough in the plane thereof.

The transducer response is elicited when an external field component in the plane of the film causes the internal magnetization of the film to rotate. Fields in the plane of the film can be considered to have two orthogonal components, one parallel to the initial magnetization called the bias field and one perpendicular to the initial magnetization called the measurand field. The bias field is required to ensure that the initial direction of magnetization in the film is stable under the influence of disturbances. The bias field should therefore be as uniform and as constant over the entire film surface as possible. The prior art uses a permanent magnet with magnetization at an angle to the magnetoresistive surface to provide the bias field. Such a bias field generation suffers from the drawback that the field lines on one side of the axis of the magnet tend to return in a direction in opposition to the desired bias field, resulting in bias field nonuniformity and sensitivity to external influences (such as nearby ferromagnetic objects).

Furthermore, it is desired that the transducer bridge be calibratable upon assembly to compensate for variations in the magnetoresistive element and magnet characteristics. Such calibration should allow the transducer bridge output voltage to be adjusted to a desired level in order to obtain optimum function of the transducer in concert with associated electronic signal conditioning apparatus. The prior art does not recognize this problem in that it neither makes mention of the need for calibration nor the means to accomplish calibration.

It has also been known in the prior art to measure speed and/or position using a ferromagnetic target having a known relation to the object being measured. Such measurements have been obtained using variable reluctance sensors in automotive anti-lock braking systems wherein the travel of a ferromagnetic target causes a voltage to be induced in the coil of the variable reluctance device due to the change of flux through the coil caused by the movement of the ferromagnetic target. The prior art anti-lock brake systems which use the variable reluctance sensors suffer from the limitations that, at low speeds, the output voltage thereof becomes small and more difficult to use and that the sensor has a strong dependence upon the gap between the target and the face of the sensor.

SUMMARY OF THE INVENTION

In accordance with the present invention, the above noted problems of the prior art are minimized.

With use of the magnetoresistive transducer in place of the variable reluctance device, the transducer output level is totally independent of the speed of the target and is less sensitive to the gap between the target and the sensor, thereby allowing the use thereof in applications where a larger gap variation is required.

To measure position or velocity of a magnetic element or target using a magnetoresistive transducer, a permanent magnet, is provided which produces a DC magnetic field with a magnetoresistive transducer thereon. The target has greater ability to carry magnetic flux than the surrounding air, so the flux lines are attracted to the target (e.g., a tooth of a gearwheel). This results in a bending of the flux lines toward the tooth. The magnetoresistive device, which, in a preferred embodiment, comprises an arrangement of permalloy elements which change electrical resistance in response to changes in magnetic fields therethrough, can sense the bending of the field. Such magnetoresistive elements can be composed of permalloy or other materials. These magnetoresistive elements are arranged into a bridge structure, either half or full Wheatstone bridge, such that a voltage divider network is created. Resistance changes in the magnetoresistive elements are converted to a differential voltage output by the bridge structure.

As a succession of teeth passes the magnet, the flux lines are attracted to and bent by each particular tooth until that tooth passes out of range. At the same time, the following tooth is just approaching the field and the field is then bent in the opposite direction, toward the approaching tooth. Each leg of the magnetoresistive bridge is designed such that it provides a polarized output, for example, a positive output when bent by a departing tooth and a negative output when bent by an approaching tooth (the converse can also be true). The output of the full bridge which results for a succession of similar teeth is approximately a sine wave whose pulses can be counted for a speed sensing application.

A single tooth or ferromagnetic anomaly or target is employed to detect the position of a rotating member. As the magnetic target passes the magnet and transducer, the target disturbs or bends the magnetic field passing through the transducer. The transducer senses the change of the magnetic field therethrough caused by the passage of the target through the magnetic field and provides a change in its resistance in accordance with the instantaneous intensity of the magnetic field therethrough and in the plane thereof. The magnetoresistive transducer is in a wheatstone bridge configuration which forms a part of the measuring circuit whereby the output voltage from the bridge is proportional to the instantaneous resistance of the transducer and, thereby, to the magnetic field applied to the magnetoresistive element.

DESCRIPTION OF THE PREFERRED EMBODIMENTS

Figure 1:
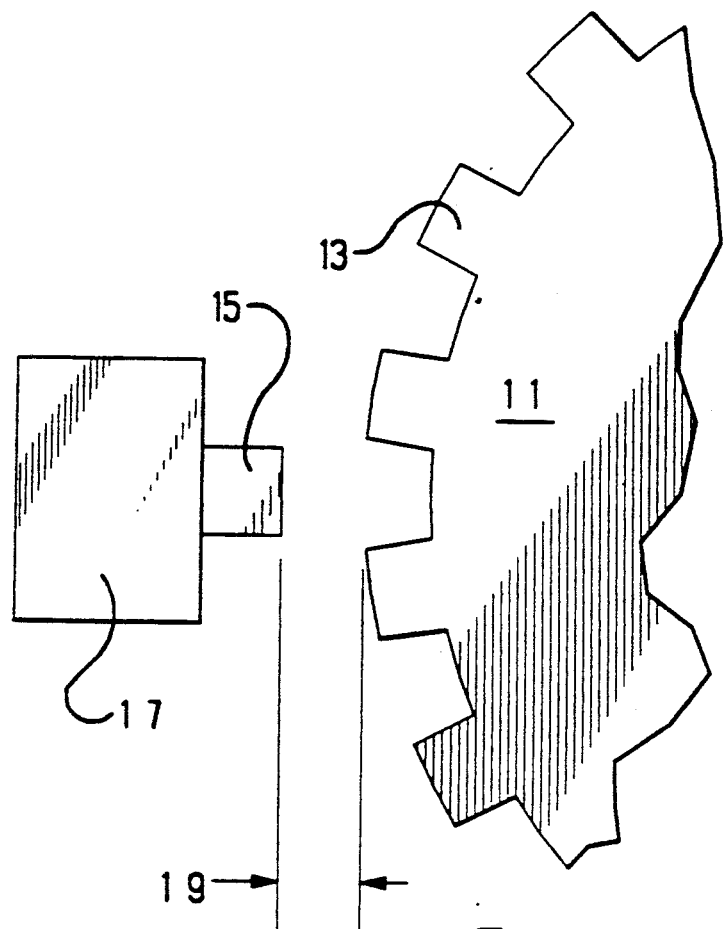
FIG. 1 is a schematic diagram of a measuring arrangement in accordance with the present invention.

Referring first to FIG. 1, there is shown a typical arrangement for measuring the position and/or velocity of a ferromagnetic target. The system includes a target 11 which is shown in the form of a gearwheel having a plurality of gear teeth 13. A magnetoresistive transducer 15 is disposed on a permanent magnet 17, the transducer being spaced from the gearwheel to form a gap 19 therebetween. The system herein is insensitive to variations in the gap 19. The biasing means is also less sensitive to magnetoresistor 15 location on the magnet 17. The transducer 15 can be a standard prior art device or it can be one of the transducers as described in the above noted copending application.

Figure 2B:
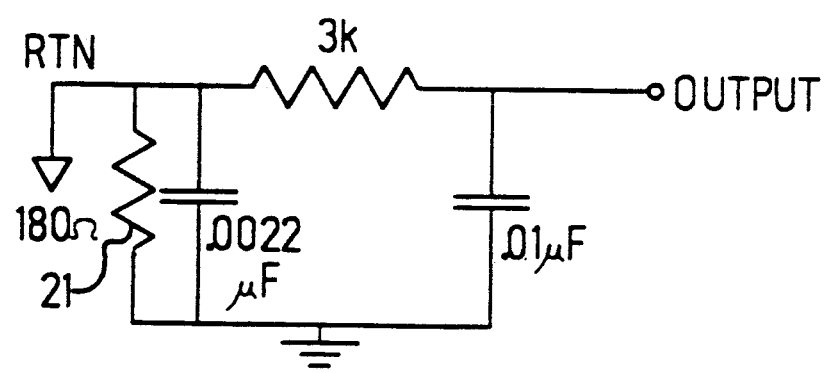
FIGS. 2a and 2b are circuit diagrams with a typical bridge circuit using a magnetoresistive transducer for measuring magnetic flux changes in accordance with a first embodiment of the invention.
Figure 2A:
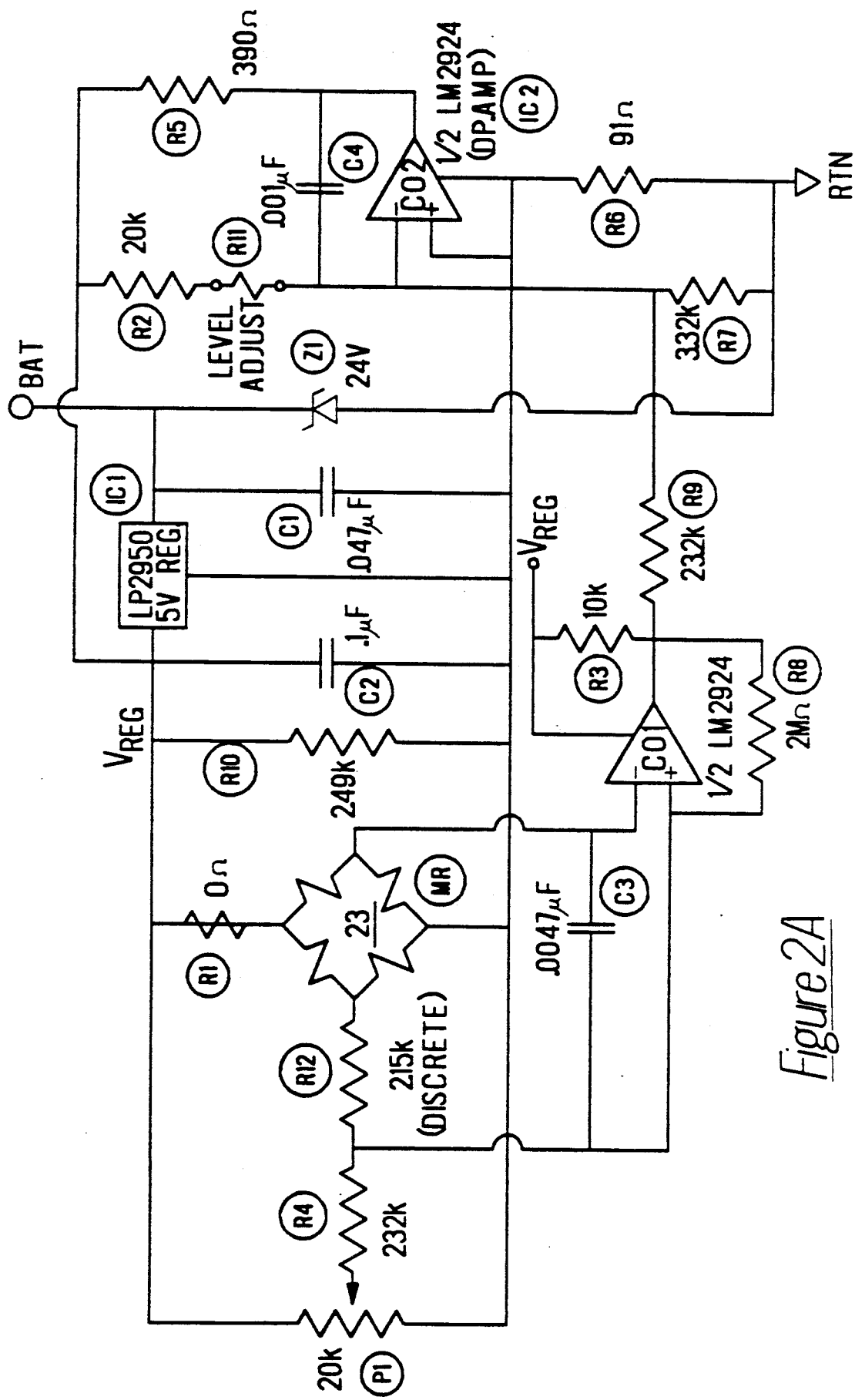

Referring now to FIG. 2a and 2b, there is shown a diagram of a circuit utilizing the magnetoresistive transducer as described hereinabove to measure changes in the magnetic field surrounding the transducer.

The circuit includes a load resistor 21, shown in FIG. 2b, which is fed by the circuit of FIG. 2a at RTN. The circuit of FIG. 2a includes a source of 5 volt regulated power IC1 which regulates power received from the battery. Capacitors C1 and C2 are provided for stability of the regulator. The bridge circuit 23 depicts the magnetoresistive transducer MR with regulated battery voltage across one pair of opposed junctions and an output across the other pair of opposed junctions. The output of the bridge circuit 23 drives a comparator C01, the output of which switches between a high and a low state, depending upon the resistance of transducer MR. The network comprising potentiometer P1, resistor R4 and resistor R12 compensates for offsets in the circuit and helps decrease the effects of temperature mismatches between the bridge 23 and the potentiometer. This compensation replaces the necessity to accurately tilt the transducer MR for calibration purposes.

The operational amplifier C02 compensates for changes in quiescent current and also provides an output to the load resistor based upon whether a tooth or the like is sensed or not sensed by the transducer MR. Any changes in quiescent current will affect the voltage across the load resistor 21 (FIG. 2b). Resistor R6 is provided as a sensing resistor whereby, if current changes in the circuit due to temperature, the amplifier C02 will supply either more or less current to the load resistor to compensate therefor. An increase/decrease in voltage across resistor R6 is reflected as a decrease/increase in voltage across resistor R7. This causes a voltage decrease/increase at the negative input to amplifier C02 to cause a decease/increase in current through the the amplifier. The output across the load resistor 21 (whether there is or is not a gear tooth or the like in the magnetic field of transducer MR0) is determined by the state of transducer MR.

The zener diode Z1 clamps the voltage across the circuit during transients at 24 volts and capacitors C3 and C4 are used for stability.

It can be seen that there have been provided electronic circuits which compensate the bridge circuit for changes in ambient temperature and which utilize a transducer including a magnetoresistive element and a magnet.

Figure 3:
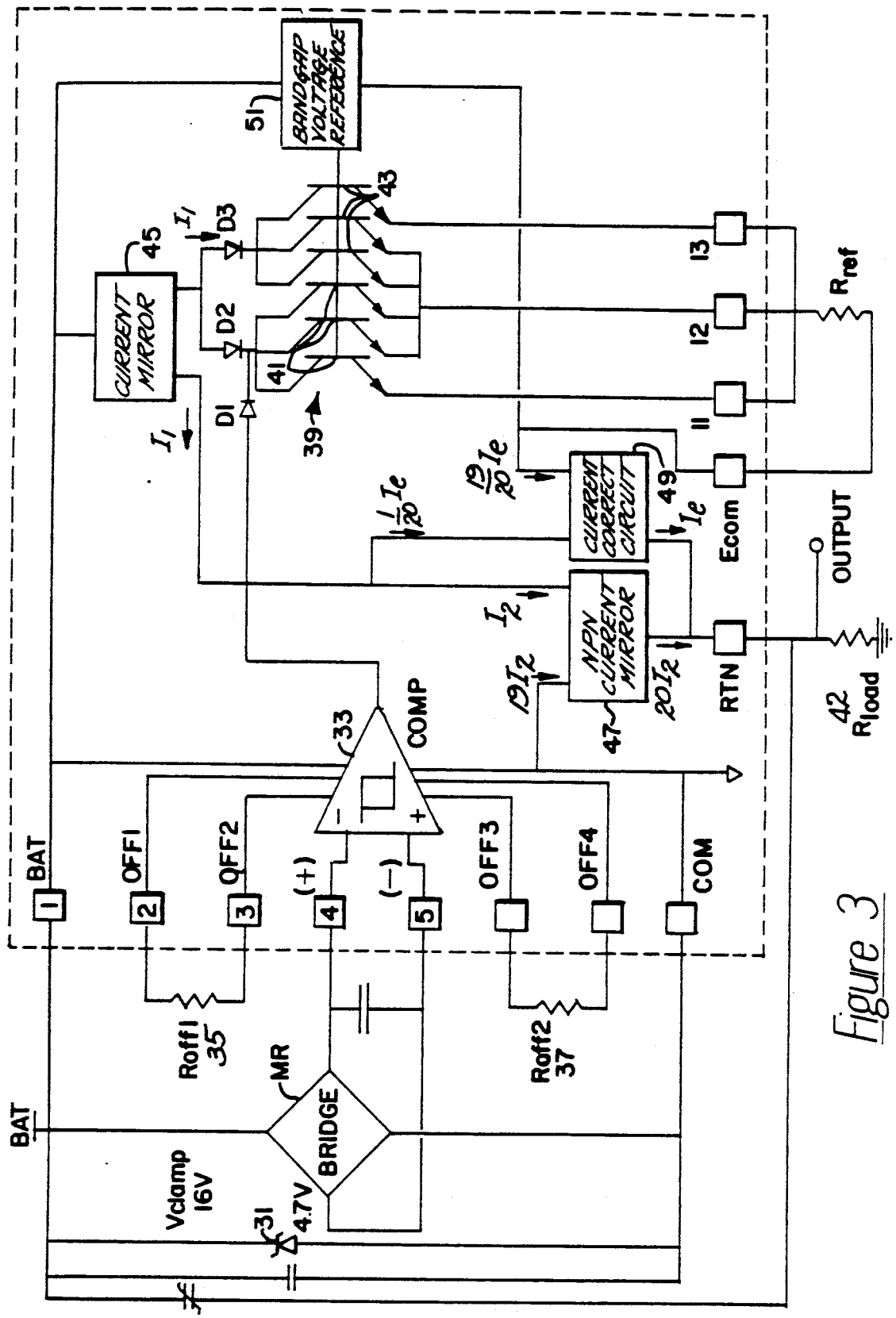
FIG. 3 is a block diagram of a second embodiment of a circuit for performing the function of the circuit of FIGS. 2a and 2b.

Referring now to FIG. 3 wherein the bridge circuit is the same as that used in the embodiment of FIGS. 2a and 2b, there is shown a second embodiment of a circuit for measuring changes in the magnetic field surrounding the transducer. This circuit is composed of three major blocks, these being a comparator 33 to switch on the zero crossing of a bridge circuit output voltage, a bandgap current source 39 comprising a bandgap voltage reference 51, transistors 41, 43 and reference resistor Rref which is modulated by the output of the comparator to provide two current state outputs and a current compensation circuit 49 which corrects for parasitic currents of the entire circuit to provide accuracy on the output current levels.

The circuit includes a bridge MR as in the prior described embodiment which is powered by a regulated voltage across one pair of arms as determined by the zener diode 31 and provides an output signal of 100 mv peak to peak across the other opposing set of arms. The bridge signal amplitude depends upon the magnetic field applied thereto externally thereof as explained above. The output of the bridge MR is fed to the input of a comparator 33, the comparator having flexibility in that its input offset voltage can be controlled and thereby compensate for initial errors from the bridge. Two offset resistors 35 and 37 are shown. The reason for the two resistors is that, in the formation of integrated circuits with resistors, laser trimming can only increase the resistance of the resistors. The offset resistors compensate for initial errors in the bridge MR.

The output of the comparator 33 is switching between a high and a low voltage, depending upon the voltage across the bridge. This comparator output modulates the current from the bandgap current reference 39, which is a stable reference, to obtain currents which do not vary appreciably with temperature or process. Since the circuit is a two wire system and current is being modulated, a voltage for the circuit in the range of 8 to 16 volts is provided across the battery terminal and the terminal marked ground. A load resistor 41 is provided between the output terminal and ground whereby the circuit current is measured across the load resistor or between the output terminal and ground.

As state above, the voltage comparator provides either a high or a low output voltage determined by the output voltage of the magnetoresistive bridge MR. The output voltage from the comparator either forward biases or reverse biases diode D2. When the comparator output voltage is low diode D1 is reversed biased and diode D2 is forward biased. In this case the sum of the currents through diodes D3 and D2 equals a known reference current set up by the bandgap current reference 39.

When the comparator output voltage is high diode D1 is forward biased which in turn reverse biases diode D2. In this case diode D2 is off and the known reference current is the sum of the currents through D1 and D3 thus current I1 in this case is comprised only of the current through diode D3 since diode D2 is off and is equal to one half of the known reference current.

Current through the right hand leg of PNP current mirror 45 as viewed in FIG. 3, the leg leading to diodes D2 and D3, is duplicated in the left leg leading to NPN current mirror 47. Thus the current through the left leg will either be equal to the known reference current or one half of the known reference current depending on the output of the comparator.

Current mirror 47 mirrors and scales the current by a factor of 19 from the right side (identified as I2 in FIG. 3) to the left side (19 I2 in FIG. 3). This current 19 I2 is drawn from comparator 33, transducer bridge MR and zener diode 31. It will be noted that current 19 I2 changes when current I2 changes. The total current out of current mirror 47 is the sum of its input currents I2 and 19 I2, or 20 I2. Thus when the output of the comparator is low, current 20 I2 is high and when the output of the comparator is high, current 20 I2 is low.

Figure 4:
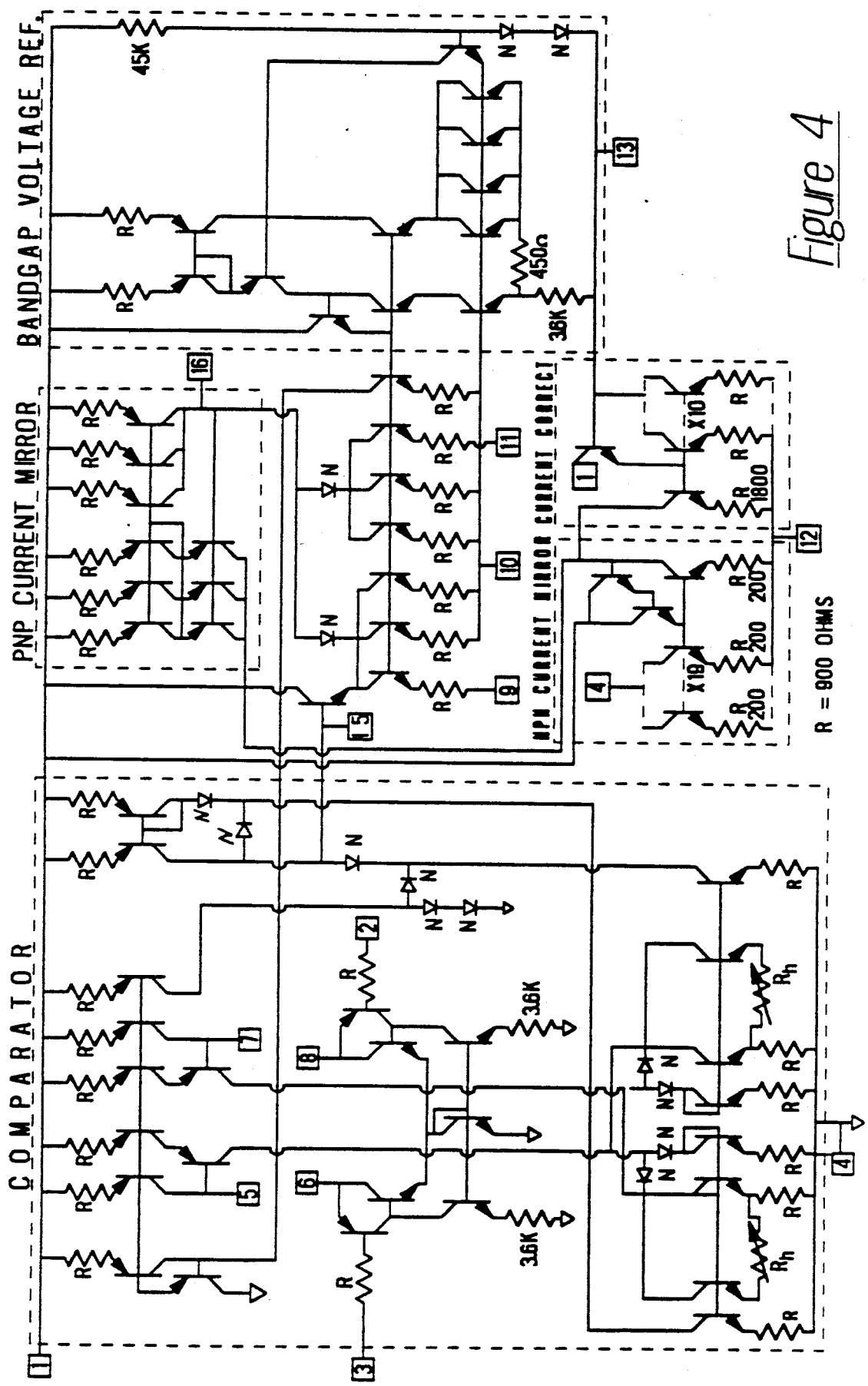
FIG. 4 is a circuit diagram of the second embodiment of FIG. 3.

Current correct circuit 49 mirrors and scales the reference current through the reference resistor Rref and the bandgap voltage reference 51 and compensates for changes in the current as temperature is varied. Current through the bandgap voltage reference 51 and reference resistor is identified as 19/20 Ie. A mirrored current of 1/20 Ie is drawn away from the mirrored current I1 of current mirror 45. The total current out of the circuit therefore is 20 I2 plus Ie. If the quiescent current through the bandgap voltage reference 51 and reference resistor Rref increases due to temperature variation 1/20th of this current will be taken away from I1 which comes from current mirror 45 so that this current will not be multiplied by 19 by current mirror 47 to cause the net current out of the circuit to remain constant. It should be noted that the current mirror 47 as well as the current correct circuit 49 are powered from current mirror 45 and the bandgap current reference circuit 39 composed of the transistors 41 and 43 are powered by the regulated circuit voltage at point 1 (FIG. 4). The bandgap voltage reference provides a tightly controlled regulated voltage at the point designated 10 in FIG. 4. A fixed current is then set up through the transistors which is determined by the bandgap output voltage and its reference resistor Rref (FIG. 3). This bandgap voltage reference, in conjunction with transistors 41, 43, makes up the bandgap current reference. For a 1 to 1 ratio in high to low output current points 9, 10 and 11 in FIG. 4 are tied together. Different high to low output current ratios can be obtained by interconnecting these points in a different arrangement.

The current mirrors 45 and 47, current correct circuit 49 and bandgap voltage reference circuit 51 are well known text book circuits, the details of which are shown and labeled in FIG. 4.

It can be seen that whenever the bridge MR provides a signal reversal or other appropriate signal to the comparator 33, the comparator will cause a change in bias condition of diode D2 and thereby cause a change in the value of current I1, this causing a change in the output which is detected by detecting circuitry (not shown).

FIG. 4 is a circuit diagram showing the details and parameter values of a preferred embodiment of a circuit corresponding to the block diagram of FIG. 3.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A two wire circuit to provide a modulated output current dependent upon the level of output voltage of a magnetoresistive transducer bridge comprising a magnetoresistive transducer bridge having an output voltage level dependent upon a condition, a voltage source coupled to the bridge, a voltage comparator coupled to the output of the bridge, the comparator having a high or low voltage output depending upon the output voltage level of the bridge, bandgap current source means comprising first and second pluralities of transistors, PNP current mirror means having a first output leg coupled to the first and second pluralities of transistors through first and second diodes respectively, the current mirror means having a second output leg coupled to a first input of an NPN current mirror, the NPN current mirror having a second input coupled to the comparator to draw current from the comparator, the NPN current mirror having an output connected to a load resistor in turn connected to ground, the comparator output connected through a third diode to a point intermediate the first plurality of transistors and the first diode so that when the comparator has a high voltage output the third diode is forward biased and the first diode is reversed biased and when the comparator has a low voltage output the third diode is reverse biased and the first diode is forward biased.

2. A two wire circuit according to claim 1 further including a current correct circuit having first and second inputs, the output of the bandgap current source means coupled to the first input of the current correct circuit, and the second output leg of the PNP current mirror coupled to the second input of the current correct circuit, the current correct circuit having an output which is connected to the output of the NPN current mirror.

3. A two wire circuit to provide a modulated output current dependent upon the output voltage of a magnetoresistive transducer bridge comprising
   a bridge circuit having magnetoresistive elements arranged in a bridge structure, the bridge circuit having two pairs of opposed junctions, a regulated battery voltage provided across one pair of the opposed junctions, the other pair of opposed junctions providing a voltage output dependent upon a magnetic field in which the elements are disposed,
   a voltage comparator having first and second inputs coupled to the voltage output of the bridge circuit, the comparator having an output, the output being either a high or a low voltage based on the voltage outputs of the bridge circuit,
   a current mirror having a reference leg and a mirrored leg, the reference leg having first and second branches, a diode disposed between each branch and the current mirror with their anodes connected to the current mirror,
   means to provide a selected reference current through the reference leg,
   a third diode having its anode coupled to the comparator output and its cathode coupled to the cathode of one of the branch diodes,
   whereby when the comparator output voltage is low the third diode is reverse biased and the said one of the branch diodes is forward biased and the sum of the currents through the branch diodes equals the selected current resulting in the selected current in the mirrored leg and when the comparator output voltage is high the third diode is forward biased and the said one of the branch diode is reversed biased with the selected current being the sum of currents through the third diode and the other of the branch diodes resulting in only a portion of the selected current in the mirrored leg.

4. A two wire circuit according to claim 3 further including a scaling current mirror having first and second inputs, the first input of the scaling current mirror coupled to the mirrored leg and the second input of the scaling current mirror coupled to the comparator, the output of the scaling comparator connected to an output terminal.

5. A two wire circuit according to claim 4 further including a current correct circuit having first and second inputs and an output, the first input of the current correct circuit coupled to the output current of the first and second branches and the second of the current correct circuit inputs coupled to the mirrored leg, the output of the current correct circuit coupled to the output of the scaled current mirror.

* * * * *